United States Patent [19]

Edagawa et al.

[11] Patent Number: 5,574,590
[45] Date of Patent: Nov. 12, 1996

[54] OPTICAL AMPLIFYING TRANSMITTING SYSTEM

[75] Inventors: Noboru Edagawa, Tokyo; Masatoshi Suzuki, Kawajima-Saitama; Hidenori Taga, Sakado; Itsuro Morita, Tokyo; Shu Yamamoto, Shiki; Shigeyuki Akiba, Tokyo, all of Japan

[73] Assignee: Kokusai Denshin Denwa Kabushiki Kaisha, Tokyo, Japan

[21] Appl. No.: 521,838

[22] Filed: Aug. 31, 1995

[30] Foreign Application Priority Data

Sep. 12, 1994 [JP] Japan .................................. 6-242406

[51] Int. Cl.⁶ .......................... H04B 10/16; H04B 10/12
[52] U.S. Cl. ........................ 359/179; 359/161; 359/173
[58] Field of Search ............................. 359/161 X, 174, 359/177, 179–180, 181, 188, 173 X

[56] References Cited

U.S. PATENT DOCUMENTS

| | | | |
|---|---|---|---|
| 5,343,322 | 8/1994 | Pirio et al. | 359/161 |
| 5,365,362 | 11/1994 | Gnauk et al. | 359/179 |
| 5,471,333 | 11/1995 | Taga et al. | 359/179 |

FOREIGN PATENT DOCUMENTS 532388  3/1993  European Pat. Off. ............... 359/173

OTHER PUBLICATIONS

Lin et al, "Optical Pulse Equalization and Low Disperaion Transmission in Single–Mode Fibers in the 1.3–1.7 Micrometer Spectral Region", Conference: Sixth European conference on Optical communication, York, England, pp. 91–94.

Primary Examiner—Leslie Pascal
Attorney, Agent, or Firm—Emmanuel J. Lobato; Burns & Lobato, P.C.

[57] ABSTRACT

An optical amplifying transmission system is disclosed in which a large quantity of optical fiber whose zero dispersion wavelength is longer than the wavelength of the lightwave signal is introduced to provide an RZ lightwave signal transmission system. In this system, the average zero dispersion wavelength by the optical fiber is shorter than the wavelength of the lightwave signal, the zero dispersion wavelength by the optical fiber whose length is in the range of one-thirds to two-thirds of the entire length of the optical fiber is longer than the wavelength of the lightwave signal, and the absolute value of the wavelength dispersion is larger than one-half the absolute value of the average wavelength dispersion value over the entire length of the optical fiber.

10 Claims, 2 Drawing Sheets

OPTICAL AMPLIFYING TRANSMITTING SYSTEM

BACKGROUND OF THE INVENTION

The present invention relates to a fiber-optic communication system.

Next-generation high-capacity fiber optic communication systems now at the planning stage are proceeding toward a practical realization through utilization of conventional, time-tested non- return-to-zero (NZR) lightwave pulses and a novel optical amplifying-repeating technique which is an alternative to the traditional regenerative repeater technique, and it is expected that commercial fiber optic communication systems having a transmission capacity of 5 Gbit/s to 10 Gbit/s will go on stream within two or three years. In a future ultra-large-capacity optical communication system which will succeed them, the required bit rate becomes as high as tens of gigabits per second or above and the corresponding pulse width of the lightwave signal becomes as small as tens of picoseconds or below; hence, even a slight increase in the pulse width during transmission would result in serious degradation of transmission quality. For this reason, attention is now being focused on optical transmission technology which uses soliton lightwave pulses (return-to-zero (RZ) lightwave pulses of substantially a $sech^2$ type pulse waveform) whose optical wave form is said to hardly undergo degradation even by long-distance transmission, and its research and development is being carried out with the objective of providing a primary optical communication system which supports a future highly information-oriented society.

Usually, when lightwave pulses are transmitted over an optical fiber, their pulse width broadens by the wavelength dispersion characteristic of the optical fiber owing to frequency spreading inherent in data-modulated lightwave pulses. The freedom of the soliton lightwave signal from variation in its pulse waveform by transmission is achieved when the pulse width compression, which is caused by frequency chirping of the lightwave pulses owing to the optical nonlinearities of the optical fiber forming the transmission line and the wavelength dispersion characteristic of the transmission line, balances with the afore-mentioned pulse width broadening. Accordingly, to accomplish the optical soliton transmission which maintains theabove-mentioned balance and hence is almost free from variations in the lightwave pulse waveform, it is necessary that the zero dispersion wavelength of the transmission line be shorter than the wavelength of the lightwave signal to hold a desired wavelength dispersion characteristic (see "Soliton Propagation in Long Fibers with Periodically Compensated Loss," L. F. Mollenauer, J. P. Gordon, and M. N. Islam, IEEE Quantum Electron., QE-22, pp.157–176, 1986).

In the optical soliton transmission which is almost free from waveform degradation by transmission, timing jitter which is brought about by various causes during transmission constitutes a main factor that determines the transmission characteristic, along with degradation of the SN ratio by accumulated optical noises. The Gordon-Haus jitter, which forms a main part of such timing jitter, is attributable to such a phenomenon as described below. That is to say, in the optical amplifying transmission system the optical soliton carrier frequency, which randomly fluctuates due to optical noises produced by optical repeater-amplifiers, is converted mainly by the wavelength dispersion characteristic of the fiber optic transmission line into fluctuations in the system propagation time (see "Random Walk of Coherently Amplified Solitons in Optical Fiber", J. P. Gordon and H. A. Haus, Opt. Lett., vol. 11, pp.665–667, 1986). The Gordon-Haus jitter increases with distance, and hence exerts a great influence onlong-distance soliton transmission; furthermore, the pulse spacing reduced by the Gordon-Haus jitter increases the interaction between adjacent optical soliton pulses, newly causing timing jitter. Thus, the Gordon-Haus jitter is an important problem yet to solve for putting the system to practical use.

It is effective in suppressing the Gordon-Haus jitter to make the optical nonlinear constant and wavelength dispersion of the transmission line small, the mode field diameter of the optical fiber large, the pulse width large and the amount of optical noise small, but it is known that the jitter cannot easily be reduced for such reasons as listed below. 1) An increase in the pulse width causes a decrease in the pulse spacing, resulting in the generation of timing jitter by the interaction between adjacent pulses. 2) Too much reduction of the wavelength dispersion decreases the power of the corresponding lightwave pulse by the afore-mentioned balancing mechanism, providing increased degradation of the SN ratio by accumulated optical noise. 3) The optical nonlinear constant of the quartz optical fiber is small by nature and its substantial reduction cannot be expected. 4) It is not desirable to set the mode field diameter of the optical fiber to a value larger than that at present, because it will deteriorate the bending loss characteristic. 5) The noise figure of the optical amplifier at present is already appreciably close to its theoretical limit and the reduction of the noise figure that can be expected in the future is as small as 1 dB or so.

For the reasons given above, it is customary in the prior art to insert optical elements for jitter reduction use in the transmission line of an ordinary soliton transmission system, by which the timing jitter could be suppressed to some extent. At present, however, the jitter suppressing mechanism is too complicated to be practical and the timing jitter is not suppressed much enough to provide a system margin satisfactory for practical use.

SUMMARY OF THE INVENTION

An object of the present invention is to provide a practical long-distance, high-capacity optical amplifying transmission system of tens of gigabits per second transmission rate which solves the above-mentioned problems and which has an increased system margin, the transmission system being based on optical solitons, not much employed in the prior art.

To solve the problems of the prior art, the optical amplifying transmission system according to the present invention aims at the transmission of the RZ lightwave signal by intentionally introducing a large quantity of optical fiber having a zero dispersion wavelength longer than the signal wavelength in a conventional optical soliton system wherein the zero dispersion wavelength of the optical fiber for transmission needs to be held shorter than the wavelength of the lightwave signal. The opical amplifying transmission system has a structure in which the average zero dispersion wavelength of the optical fiber for transmission is shorter than the wavelength ofthe lightwave signal, the zero dispersion wavelength of the optical fiber within the range of ⅓ to ⅔ of the total length thereof is longer than the wavelength of the lightwave signal and the absolute value of the wavelength dispersion is larger than one half the absolute value of the average wavelength dispersion value over the entire length of the optical fiber.

Moreover, a plurality of repeater sections of such an optical amplifying transmission system are each formed by an optical fiber for transmission which has a zero dispersion wavelength is shorter than the wavelength of the lightwave signal and an optical fiber for transmission which has a zero dispersion wavelength is longer than the wavelength of the lightwave signal.

In the presence of the Gordon-Haus jitter in the conventional optical soliton system, lightwave signals undergo random fluctuations in carrier wavelengths owing to optical noise at respective locations in the system; since the zero dispersion wavelength of the optical fiber for transmission is shorter than the wavelength of the lightwave signal, the propagation speed of the lightwave signal whose carrier wavelength has shifted to a longer wavelength decreases, whereas the propagation speed of the lightwave signal whose carrier wavelength has shifted to a shorter wavelength increases. As mentioned above, the opitcal amplifying transmission system according to thepresent invention uses, in combination, optical fibers of zero dispersion wavelengths longer and shorter than the wavelength of the lightwave signal. The combined use of such optical fibers for transmission inverts a relationship between the carrier wavelength shift and the transmission rate at respective locations in the optical amplifying transmission system. This remarkably lessens the effect of timing jitter which is accumualted in the transmitted lightwave signal, and hence appreciably improves the system margin. This is particularly marked when the absolute value of the wavelength dispersion of the optical fiber whose zero dispersion wavelength is longer than the wavelength of the lightwave signal is larger than one-half the absolute value of the average wavelength dispersion over the entire length of the optical fiber for transmission in the system.

According to the present invention, since the pulse width of the lightwave signal being transmitted is increased by temporarily destroying the balance based on the aforementioned soliton effect in the optical amplifying transmission system, non-soliton light is generated during transmission, but when the distance of transmission is relatively short, it does not constitute a factor of serious degradation of transmission characteristic, and even if the accumulation of such non-soliton light significantly impairs the transmission characteristic when the distance of transmission is extended, the degradation could extremely be reduced by providing optical filters in the system to remove the non-soliton light. Thus, the present invention improves the transmission characteristic markedly.

The inventors propose the present invention on the basis of findings that the zero dispersion wavelength of the optical fiber for transmission, which is required to be shorter than the wavelength of the lightwave signal in the conventional light soliton system with practically no variations in the optical pulse waveform, may also be made longer than the wavelength of the lightwave signal in an appreciably large number of repeater sections in the actual system.

BRIEF DESCRIPTION OF DRAWINGS

The present invention will be described in detail below with reference to accompanying drawings, in which.

DETAILED DESCRIPTION (Embodiment 1)

Figure 1:
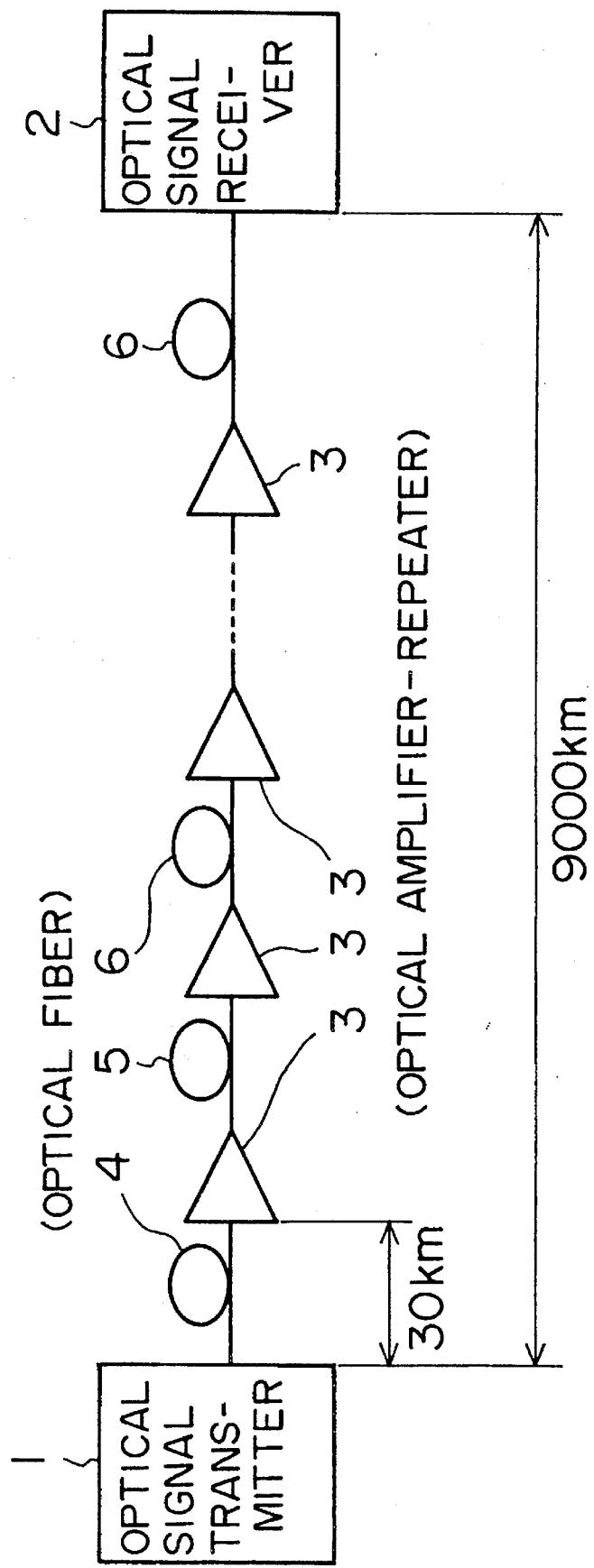
FIG. 1 is a block diagram illustrating an embodiment of a 9000 km, 20 Gbit/s, RZ lightwave signal transmission system.

FIG. 1 illustrates a first embodiment of the present invention, which is a 9000-km long, 20-Gbit/s RZ lightwave transmission system. Reference numeral 1 denotes a 20-Gbit/s RZ optical signal transmitting station, 2 a 20-Gbit/s RZ optical signal receiving station, 3 optical amplifier repeaters, and 4, 5 and 6 optical fibers for transmission use. The wavelength of the optical signal (lightwave signal) is 1556 nm. The pulse waveform of the lightwave signal is substantially the $sech^2$ type and the pulse width is 11.5 ps. The total length of the optical fibers 4, 5 and 6 is about 9000 km and the average wavelength dispersion value is set to 0.21 ps/nm/km. To compensate for losses of the optical fiber, 300 amplifier-repeaters formed of erbium-doped optical fiber are provided at intervals of about 30 km. The average optical output power of the optical amplifier-repeaters is set to around 0 dBm so that the average optical power of each repeater section satisfies a soliton condition.

In this embodiment, the wavelength dispersion values of the optical fibers at the wavelength of the lightwave signal are about −0.6 ps/nmn/km for the optical fiber 4, about 1.2 ps/nm/km for the optical fiber 5 and about 0 ps/nm/km for the optical fiber 6. The 9000-km long optical fiber is formed by arranging the optical fibers 4, 5 and 6 in the repeating cyclic order shown in FIG. 1. A positive wavelength dispersion value means that the zero dispersion wavelength of the optical fiber is shorter than the wavelength of the lightwave signal, and a negative wavelength dispersion value means that the zero dispersion wavelength of the optical fiber is longer than the wavelength of the lightwave signal.

To demonstrate the effectiveness of this embodiment, the 9000 km long optical transmission line was actualized equivalently by 100 turns of a fiber optic loop composed of three optical fibers about 30 km long and four optical amplifiers.

As the results of experiments, a bit error rate of $10^{-9}$ could not ever be accomplished after 9000-km transmission in the conventional system, but in the experimental system of the optical fiber loop composed of the optical fibers 4, 5 and 6 according to B this embodiment, the bit error rate after 11500-km transmission was about $10^{-9}$, which corresponds to a bit error rate of about $3 \times 10^{-13}$ after 9000-km transmission. Thus, the use of the present invention achieved considerable improvement in the transmission characteristic.

In this embodiment the optical fiber whose zero dispersion wavelength is longer than the wavelength of the lightwave signal is only one-third the entire length of the optical fiber in the system, but according to the principles referred to previously, the effectiveness of the present invention would increase remarkably when about one half the entire length of the optical fiber is formed by the optical fiber whose zero dispersion wavelength is longer than the wavelength of the lightwave signal. It can be understood from analogy with this embodiment that marked improvement in the transmission characteristic by the present invention could be achieved until the length ofsuch an optical fiber is increased up to about two-thirds the entire length of the optical fiber. Furthermore, while this embodiment employs the $sech^2$ type RZ lightwave pulse, the present invention is applicable to a wide variety of RZ lightwave pulse waveforms since it is well-known that in the actual optical amplifying, multi-repeating transmission system, the RZ lightwave pulse, if close to the sech$^2$ to some extent, approaches the sech$^2$ type by virtue of the soliton effect.

It has been clarified by computer simulations that the transmission characteristic can also be improved by the present invention in an optical amplifying transmission system which is characterized in that wavelength dispersion media, though not used in this embodiment, which locally change the wavelength dispersion, are inserted in the system at respective locations thereof in a manner to cancel accumulated wavelength dispersion by the transmission line. Moreover, while in this embodiment the optical fiber whose zero dispersion wavelength is longer than the wavelength of the lightwave signal is used for every three repeating sections, the transmission characteristiccan similarly be improved by the present invention when such optical fibers are well distributed throughout the transmission system. For example, letting the number of all repeating sections be represented by N, the optical fiber whose zero dispersion wavelength is longer than the wavelength of the lightwave signal needs only to be provided in each of about N/10 continuous repeater sections.

(Embodiment 2)

Figure 2:
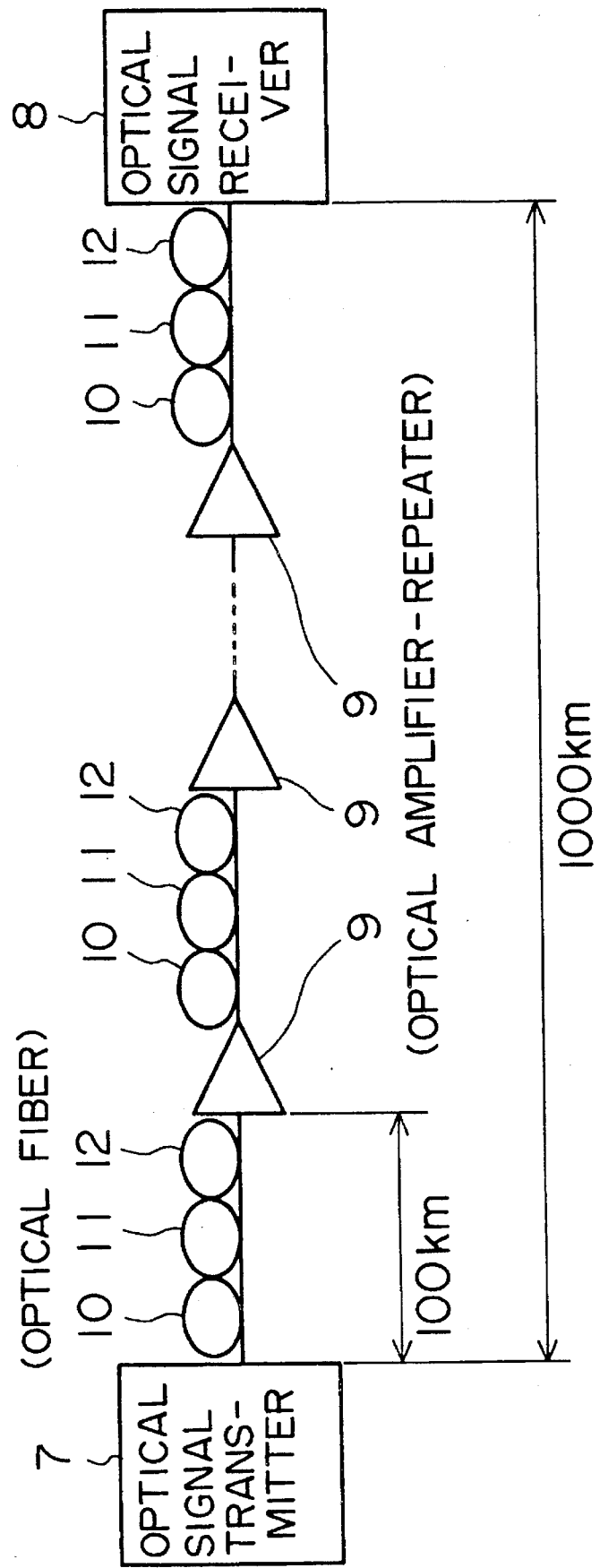
FIG. 2 is a block diagram illustrating a 1000-km, 20 Gbit/s RZ lightwave signal transmission system.

FIG. 2 illustrates a second embodiment of the present invention, which is a 1000-km long, 20 Gbit/s RZ lightwave signal transmission system. Reference numeral 7 denotes a 20 Gbit/s RZ optical signal transmitter, 8 a 20 Gbit/s RZ optical receiver, 9 optical amplifier-repeaters, and 10, 11 and 12 optical fibers for transmission use. The optical fibers are each around 33 km in length and the three optical fibers are used to form a repeating span about 100 km long.

In this embodiment, the wavelength dispersion values by the optical fibers at the wavelength of the lightwave signal are about 0 to −0.2 ps/nm/km for the optical fiber 10, about 1.9 to 2.5 ps/nm/km for the optical fiber 11 and about −0.2 to 0.2 ps/nm/km for the optical fiber 12. In this instance, a positive wavelength dispersion value means that the zero dispersion wavelength of the optical fiber is shorter than the wavelength of the lightwave signal, and a negative wavelength dispersion value means that the zero dispersion wavelength of the optical fiber is longer than the wavelength of the lightwave signal.

Though not fully shown in FIG. 1, the 1000-km transmission system in its entirety is formed by 10 sections of 100-km long optical fibers and nine optical amplifier-repeaters. In this embodiment, the wavelength of the lightwave signal is 1554 nm, the average wavelength dispersion by the transmission line at that wavelength of the lightwave signal is around 0.33 ps/nm/km, the section loss is about 24 dB, and the half-amplitude value of the RZ lightwave signal of substantially a sech$^2$ pulse waveform is about 20 ps. The time-average repeater output was set to approximately 6 dBm. A bit error rate of about $1 \times 10^{-10}$ could be achieved with a sufficient margin, by which it was demonstrated that the present invention permits the construction of a very excellent long-distance, high-capacity optical transmission system. Furthermore, it was ascertained by computer simulations that an excellent transmission characteristic could similarly be obtained by the present invention also in a 9000-km transmission system wherein the repeater spacing was decreased to 30 km.

While this embodiment uses the sech$^2$ RZ lightwave pulse, the present invention is applicable to a wide variety of RZ optical pulse waveforms, since it is well-known that in the actual optical amplifying, multi-repeating transmission system, the RZ lightwave pulse, if close to the sech$^2$ type to some extent, would approach the sech$^2$ by virtue of the soliton effect.

The present invention markedly improves the system margin of the optical fiber transmission system based on the optical soliton, which has not been much used in the past; hence, the invention is of great utility in practical use. The present invention offers techniques indispensable to the realization of a tens of gigabits per second, long-distance, high-capacity fiber optic communication system.

What we claim is:

1. An optical amplifying transmission system, comprising: an optical fiber for transmitting a lightwave signal with digital information located on return to-zero lightwave pulses and a plurality of optical amplifying repeaters disposed on said optical fiber, said optical fiber having an average zero dispersion wavelength shorter than the wavelength of said light signal over the entire length thereof;

sections of said optical fiber divided by said optical amplifier repeaters being composed of first sections of said optical fiber, wherein an average zero dispersion wavelength in each of said first sections of said optical fiber is shorter than the wavelength of said lightwave signal, and second sections of said optical fiber, wherein an average zero dispersion wavelength on each of said second sections of said optical fiber is longer than the wavelength of said lightwave signal and the absolute value of an average wavelength dispersion value of said optical fiber is larger than one-half the absolute value of an average wavelength dispersion value over the entire length of said optical fiber; and the entire length of said second sections of said optical fiber is in the range of one-third to two-thirds of the entire length of said optical fiber.

2. An optical amplifying transmission system, comprising: an optical fiber for transmitting a lightwave signal with digital information loaded on return-to zero lightwave pulses and a plurality of optical amplifier repeaters disposed on said optical fiber, said optical fiber having an average zero dispersion wavelength shorter than the wavelength of said light signal over the entire length thereof:

each of sections of said optical fiber divided by said optical amplifier repeaters is composed of at least one first portion of said optical fiber, wherein an average zero dispersion wavelength on said first portion of said optical fiber is shorter than the wavelength of said lightwave signal, and at least one second portion of said optical fiber wherein an average zero dispersion wavelength on said second portion of said optical fiber is longer than the wavelength of said lightwave signal and the absolute value of a wavelength dispersion value is larger than one-half the absolute value of an average wavelength dispersion value over the entire length of said optical fiber; and the entire length of the second portions of said optical fiber is in the range of one-third to two-thirds of the entire length of said optical fiber.

3. An optical amplifying transmission system according to claim 1 or 2, in which letting the number of sections of said optical fiber be represented by N, each of about N/10 successive repeater sections includes said optical fiber whose zero dispersion wavelength is longer than the wavelength of said optical signal.

4. An optical amplifying transmission system according to claim 1 or 2, in which wavelength dispersion media are inserted for locally changing the wavelength dispersion to cancel accumulated wavelength dispersion of said optical fiber.

5. An optical amplifying transmission system according to claim 1 or 2, further comprising an optical transmitter for transmitting said lightwave signal over said optical fiber and an optical receiver for receiving said lightwave signal transmitted over said optical fiber.

6. An optical amplifying transmission system, comprising: an optical fiber for transmitting a lightwave signal with digital information loaded on return-to zero lightwave pulses and a plurality of optical amplifying repeaters disposed on said optical fiber, said optical fiber having an average zero dispersion wavelength shorter than the wavelength of said light signal over the entire length thereof;

sections of said optical fiber divided by said optical amplifier repeaters being composed of first sections of said optical fiber, wherein an average zero dispersion wavelength on each of said first sections of said optical fiber is shorter than the wavelength of said lightwave signal, and second sections of said optical fiber, wherein an average zero dispersion wavelength on each of said second sections of said optical fiber is longer than the wavelength of said lightwave signal and the absolute value of an average wavelength dispersion value of said optical fiber is larger than one-half the absolute value of an average wavelength dispersion value over the entire length of said optical fiber;

the entire length of said second sections of said optical fiber is in the range of one-third to two-thirds of the entire length of said optical fiber; and wavelength dispersion media are inserted for locally changing the wavelength dispersion to cancel accumulated wavelength dispersion of said optical fiber.

7. An optical amplifying transmission system, comprising: an optical fiber for transmitting a lightwave signal with digital information loaded on return to-zero lightwave pulses and a plurality of optical amplifying repeaters disposed on said optical fiber;

said optical fiber having an average zero dispersion wavelength shorter than the wavelength of said light signal over the entire length thereof;

sections of said optical fiber divided by said optical amplifier repeaters are composed of first sections of said optical fiber, wherein an average zero dispersion wavelength on each of said first sections of said optical fiber is shorter than the wavelength of said lightwave signal, and second sections of said optical fiber, wherein an average zero dispersion wavelength on each of said second sections of said optical fiber is longer than the wavelength of said lightwave signal and the absolute value of an average wavelength dispersion value on each of said second sections of said optical fiber is larger than one half the absolute value of an average wavelength dispersion value over the entire length of said optical fiber;

the entire length of said second sections of said optical fiber is in the range of one-third to two-thirds of the entire length of said optical fiber; and an optical transmitter for transmitting said lightwave signal over said optical fiber and an optical receiver for receiving said lightwave signal transmitted over said optical fiber.

8. An optical amplifying transmission system, comprising: an optical fiber for transmitting a light wave signal with digital information loaded on return-to-zero lightwave pulses and a plurality of optical amplifier repeaters disposed on said optical fiber;

said optical fiber having an average zero dispersion wavelength shorter than the wavelength of said light signal over the entire length thereof;

each of sections of said optical fiber divided by said optical amplifier repeaters is composed of at least one first portion of said optical fiber, wherein an average zero dispersion wavelength on said first portion of said optical fiber, wherein an average zero dispersion wavelength on said first portion of said optical fiber is shorter than the wavelength of said lightwave signal, and at least one second portion of said optical fiber wherein an average zero dispersion wavelength on said second portion of said optical fiber is longer than the wavelength of said lightwave signal and the absolute value of a wavelength dispersion value is larger than one half the absolute value of an average wavelength dispersion value over the entire length of said optical fiber;

the entire length of sections of said optical fiber is in the range of one third to two thirds of the entire length of said optical fiber; and wavelength dispersion media are inserted for locally changing the wavelength dispersion to cancel accumulated wavelength dispersion of said optical fiber.

9. An optical amplifying transmission system, comprising: an optical fiber for transmitting a lightwave signal with digital information loaded on return-to-zero lightwave pulses and a plurality of optical amplifier repeaters disposed on said optical fiber;

said optical fiber having an average zero dispersion wavelength shorter than the wavelength of said light signal over the entire length thereof;

each of sections of said optical fiber divided by said optical amplifier repeaters is composed of at least one first portion of said optical fiber, wherein an average zero dispersion wavelength on said first portion of said optical fiber is shorter than the wavelength of said lightwave signal, and at least one second portion of said optical fiber wherein an average zero dispersion wavelength on said second portion of said optical fiber is longer than the wavelength of said lightwave signal and the absolute value of an average wavelength dispersion value over the entire length of said optical fiber;

the entire length of the second portions of said optical fiber is in the range of one-third to two-thirds of the entire length of said optical fiber; and an optical transmitter for transmitting said lightwave signal over said optical fiber and an optical receiver for receiving said lightwave signal transmitted over said optical fiber.

10. An optical amplifying transmission system according to any one of claims 6 through 9, in which letting the number of sections of said optical fiber be represented by N, each of about N/10 successive repeater sections includes said optical fiber whose zero dispersion wavelength is longer than the wavelength of said optical signal.

* * * * *